(12) United States Patent
Harsch

(10) Patent No.: US 8,792,669 B2
(45) Date of Patent: Jul. 29, 2014

(54) EARPHONE SYSTEM AND USE OF AN EARPHONE SYSTEM

(75) Inventor: Samuel Harsch, Ballaigues (CH)

(73) Assignee: Phonak AG (CH)

( * ) Notice: Subject to any disclaimer, the term of this patent is extended or adjusted under 35 U.S.C. 154(b) by 859 days.

(21) Appl. No.: 12/992,050

(22) PCT Filed: May 21, 2008

(86) PCT No.: PCT/EP2008/004094
§ 371 (c)(1),
(2), (4) Date: Dec. 28, 2010

(87) PCT Pub. No.: WO2009/140982
PCT Pub. Date: Nov. 26, 2009

(65) Prior Publication Data
US 2011/0103610 A1    May 5, 2011

(51) Int. Cl.
*H04R 1/10* (2006.01)
(52) U.S. Cl.
CPC .................................. *H04R 1/1016* (2013.01); *H04R 1/1075* (2013.01)
USPC .......................................... 381/380; 381/370
(58) Field of Classification Search
CPC ...... H04R 1/10; H04R 1/1016; H04R 1/1075; H04R 1/6058
USPC ................. 381/312, 322, 324, 328, 370, 380; 379/430; 455/575.2
See application file for complete search history.

(56) References Cited

U.S. PATENT DOCUMENTS

| | | | |
|---|---|---|---|
| 5,878,070 | A | 3/1999 | Ho et al. |
| 7,016,512 | B1 | 3/2006 | Feeley et al. |
| 7,139,404 | B2 | 11/2006 | Feeley et al. |
| 2004/0201139 | A1 | 10/2004 | Widmer et al. |
| 2006/0133636 | A1 | 6/2006 | Harvey et al. |
| 2006/0285715 | A1 | 12/2006 | Drambarean et al. |

(Continued)

FOREIGN PATENT DOCUMENTS

| | | |
|---|---|---|
| DE | 3331303 A1 | 3/1985 |
| DE | 10111636 B4 | 9/2002 |

(Continued)

OTHER PUBLICATIONS

International Search Report and Written Opinion dated Nov. 4, 2008 issued in corresponding International Application No. PCT/EP2008/004094.

(Continued)

*Primary Examiner* — Tuan D Nguyen
(74) *Attorney, Agent, or Firm* — Conley Rose, P.C.

(57) ABSTRACT

There is provided an earphone system comprising an earphone and at least two acoustic dampers (24), the earphone comprising a speaker unit (10) and an earpiece (12, 12A, 12B), the speaker unit comprising a sound driver (18), a wiring connector (14) for providing audio signals to the sound driver and a case (16) housing the sound driver, the earpiece comprising a sound outlet opening (28) and being designed for being worn in a user's ear canal and/or concha, the sound driver having a frequency response having a maximum within the range of 2000 Hz to 4000 Hz, wherein the speaker unit is for being inserted into the earpiece, wherein each of the acoustic dampers (24) is for being inserted into the earpiece or the speaker unit in an exchangeable manner and wherein each of the acoustic dampers, when used with the earphone, has a frequency response different from that of the other acoustic damper(s).

13 Claims, 11 Drawing Sheets

(56) References Cited

U.S. PATENT DOCUMENTS

2007/0036385 A1    2/2007    Harvey et al.
2007/0053540 A1    3/2007    Harvey
2007/0189569 A1    8/2007    Haapapuro et al.

FOREIGN PATENT DOCUMENTS

DE    102006007032 A1    8/2007
EP    1595515 A1    11/2005
EP    1629808 A1    3/2006
GB    2355129 A    11/2001

OTHER PUBLICATIONS

International Preliminary Report on Patentability dated Nov. 23, 2010 issued in corresponding International Application No. PCT/EP2008/004094.

International Search Report, International Application No. PCT/EP2008/004094, Dated May 21, 2008 (18 pages).

Killion, Mead, et al., "Smoothing the ITE Response: The BF-1743 Damped Coupling Assembly," Knowles Electronics, Inc. Jun. 1982 (17 pages).

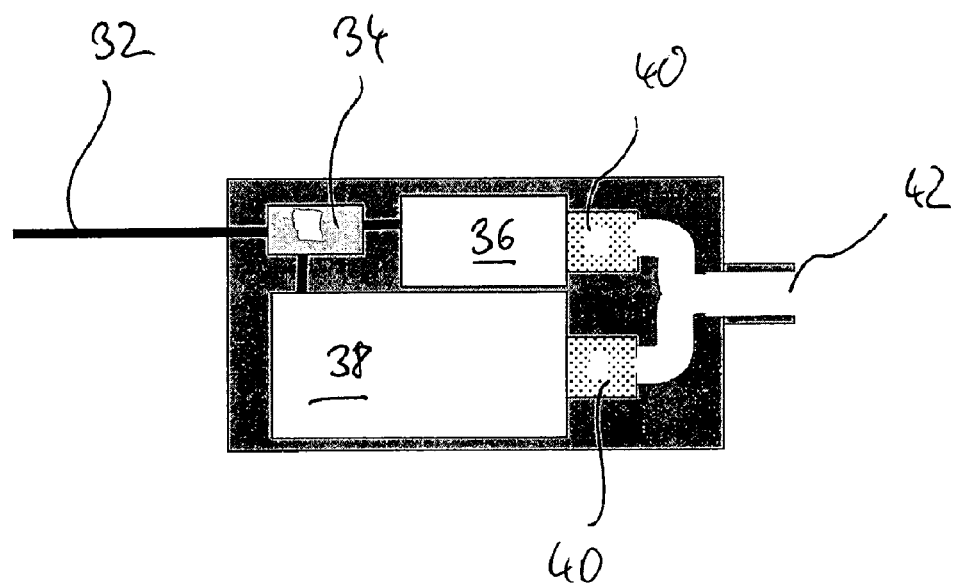
FIG. 5
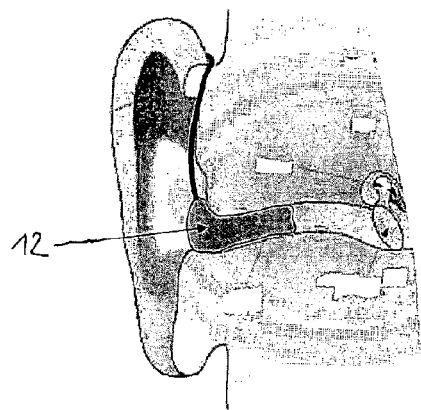 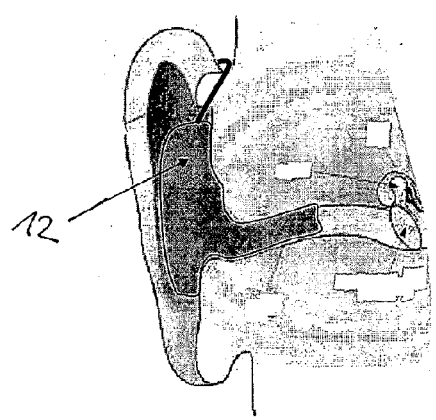
FIG. 6A FIG. 6B

EARPHONE SYSTEM AND USE OF AN EARPHONE SYSTEM

CROSS-REFERENCE TO RELATED APPLICATIONS

This application is a national phase entry of prior PCT Application No. PCT/EP2008/004094 filed May 21, 2008 and entitled "EARPHONE SYSTEM AND USE OF AN EARPHONE SYSTEM", the disclosure of which is herein incorporated by reference.

BACKGROUND OF THE INVENTION

1. Field of the Invention

The invention relates to an earphone comprising a speaker unit and an earpiece for being worn in a user's ear canal and/or concha; the invention also relates to the use of such an earphone.

2. Description of Related Art

In general, the earpiece of an intra-auricular earphone may be of the "one-size-fits-all" or generic type, wherein the earpiece comprises a shell made of a soft, flexible material and having an outer surface of standard shape, with the soft earpiece, typically delivered in a number of sizes (typically 3 or 4), adapting to the individual shape of the user's concha and ear canal due to its flexibility.

Alternatively, the earpiece may comprise a shell made of a relatively hard material and having an outer surface individually shaped according to the measured inner shape of the user's ear canal and outer ear. The measurement usually is done by taking an impression of the user's ear and subsequent laser scanning of the impression or by direct laser scanning of the user's ear. Such earpieces are known as customized earpieces. Earphones comprising a customized shell described, for example, in US 2004/0201139 A1, DE 101 11 636 B4, DE 10 2006 007 032 A1, EP 1 629 808 A1, EP 1 595 515 A1, GB 2,355,129 A, U.S. Pat. No. 7,139,404 B2 and U.S. Pat. No. 7,016,512.

U.S. Pat. No. 7,139,404 B2 and U.S. Pat. No. 7,016,512 relate to modular systems including a CIC (Completely-In-the-Canal) earphone comprising an earpiece, which may be either generic or customized and into which a speaker unit is inserted in a detachable manner, with the speaker unit being connected by wires to a BTE (Behind-The-Ear) component. The system may be used as an earphone for music from an external device or as a stage monitor for musicians. Also US 2007/0036385 A1 and US 2007/0053540 A1 relate to modular earphones comprising a speaker unit, which is inserted into an earpiece, wherein the earpiece could be either a generic earpiece or a customized earpiece and wherein the earpiece may be replaced, if the earpiece deteriorates during use; the speaker unit may comprise a two-way speaker.

US 2006/0285715 A1, U.S. Pat. No. 5,878,070 and the Knowles Application Note concerning TI-29, Report 10559-2 by M. T. Killion, relate to high end earphones comprising an acoustic damper and a resonator portion for optimizing the frequency response of the earphone, wherein the damper and the resonator portion are part of the speaker unit which is connected to an earpiece. The damper is provided within the resonator which may be a quarter-wave resonator, and is replaceable by a damper of the same kind if the damper becomes deteriorated during use of the earphone.

When an intra-auricular earphone, which closes the ear canal, is worn, the transfer function of the ear is changed in that the quarter-wave resonance of the ear canal and the amplification of the pavilion disappears, which effects cause an uncomfortable sensation to the user. Hence, it is desirable to provide the earphone with a frequency response suitable for restoring the natural open ear gain, in particular, the quarter wave resonance of the ear canal, as far as possible in order to provide for a natural hearing impression to the user when wearing the earphone.

It is an object of the invention to provide for an intra-auricular earphone which allows for an optimization of the frequency response, and, in particular, for an individual adjustment of the frequency response of the earphone to the specific user in a particularly simple manner.

SUMMARY OF THE INVENTION

According to the invention, this object is achieved by an earphone as defined in claim 1 and a use as defined in claim 23, respectively.

This solution is beneficial in that, by providing an earphone system with a plurality of exchangeable acoustic dampers, and, in particular, by testing different acoustic dampers with the earphone until a final acoustic damper has been found, which, when used with the earphone, imparts a final frequency response to the earphone, which more closely approaches the user's natural open ear gain or listening preferences than the other acoustic dampers, the acoustic performance of the earphone can be individually optimized in a simple manner after manufacturing of the earphone.

According to one embodiment, the user's natural open ear gain may be measured for selecting the final acoustic damper.

Preferably, at least the acoustic damper is integrated in the earpiece. By integrating at least the acoustic damper in the earpiece, with the earpiece being connected in a detachable manner to the speaker unit and hence being exchangeable, the most critical acoustic element is located in an exchangeable and hence individually adjustable element, namely the earpiece, and hence can be optimized with regard to the respective user. Thereby a particularly reliable adjustment of the frequency response of the earphone is enabled, which in particular allows for high fidelity sound reproduction. In particular, the length of the resonator, which preferably is a quarter-wave resonator, is very critical and has to be designed very precisely, since an inaccuracy of only a few millimeters can dramatically influence the frequency response. Such precise and individual optimization of the sound quality would not be possible, if the resonator would be part of the usually standardized speaker unit.

According to one embodiment, also the acoustic damper is intergrated in the earpiece, whereby a particularly reliable adjustment of the frequency response of the earphone is enabled.

According to an alternative embodiment, the acoustic damper is part of the speaker unit.

Preferably, the earpiece is a customized earpiece comprising a hard shell having an outer surface individually shaped according to the measured inner shape of the user's ear canal and outer ear, with the shell preferably being produced by a three-dimensional printing process. By using a customized earpiece, the resonator can be individually optimized in a particularly simple manner.

Preferably the resonator is designed for increasing the gain of frequencies above 10 kHz and the acoustic damper is located upstream of the resonator. Typically, the sound driver has a frequency response having a global maximum within the range of 2000 Hz to 4000 Hz, in order to enable restoration of the quarter-wave resonance of the ear canal. The acoustic damper is designed for affecting the frequency response of the earphone primarily in the frequency range of the user's natural ear resonance, in particular primarily in the frequency range of the resonance of the sound driver.

The sound driver may include an armature transducer or a dynamic diaphragm transducer, a back vent, a plurality of transducers, a passive electrical filter and at least one non-exchangeable acoustic damper.

It is also an object of the invention to provide for a use of an earphone system, wherein the user is enabled to choose the earphone system in a particularly comfortable and reliable manner.

According to the invention, this object is achieved by a use as defined in claim 14.

This solution is beneficial in that, by first connecting the speaker unit to a generic test earpiece, thereby forming a test earphone having a test frequency response, the user may test the acoustic performance of the test earphone before deciding that a costly customized earpiece should be manufactured for forming the final earphone for long-term use, with the final earphone having essentially the same acoustic performance as the test earphone.

Preferably, the earphone system comprises an acoustic damper and a resonator, which, according to one embodiment, are provided as part of the speaker unit and, according to an alternative embodiment, are provided as part of each of the earpieces.

Further preferred embodiments of the invention are mentioned in the dependent claims.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 5 is a schematic view of an example of a sound driver to be used with an earphone according to the invention;

FIGS. 6A and 6B are schematic sectional views of an earphone of the ITE-type and an earphone of the full shell type, respectively, when having been inserted into the user's ear;

DETAILED DESCRIPTION OF THE INVENTION

Figure 1A:
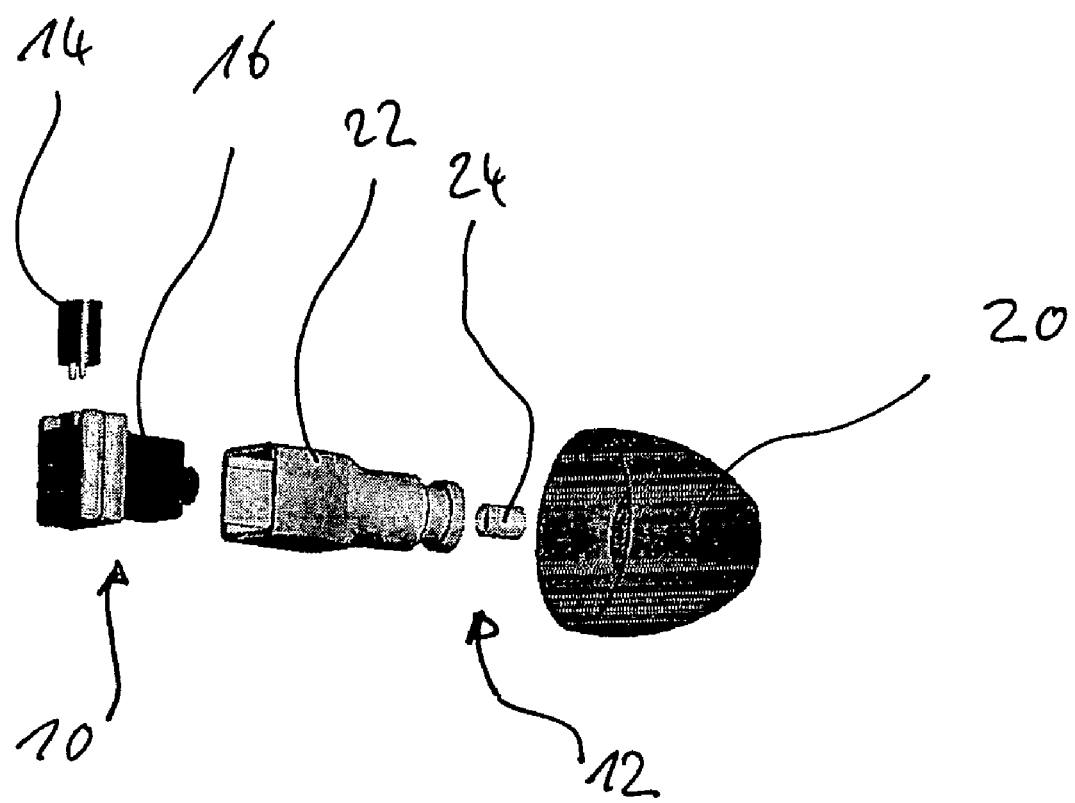
FIG. 1A is an exploded view of the components of an earphone according to a first embodiment of the invention prior to assembly.
Figure 1B:
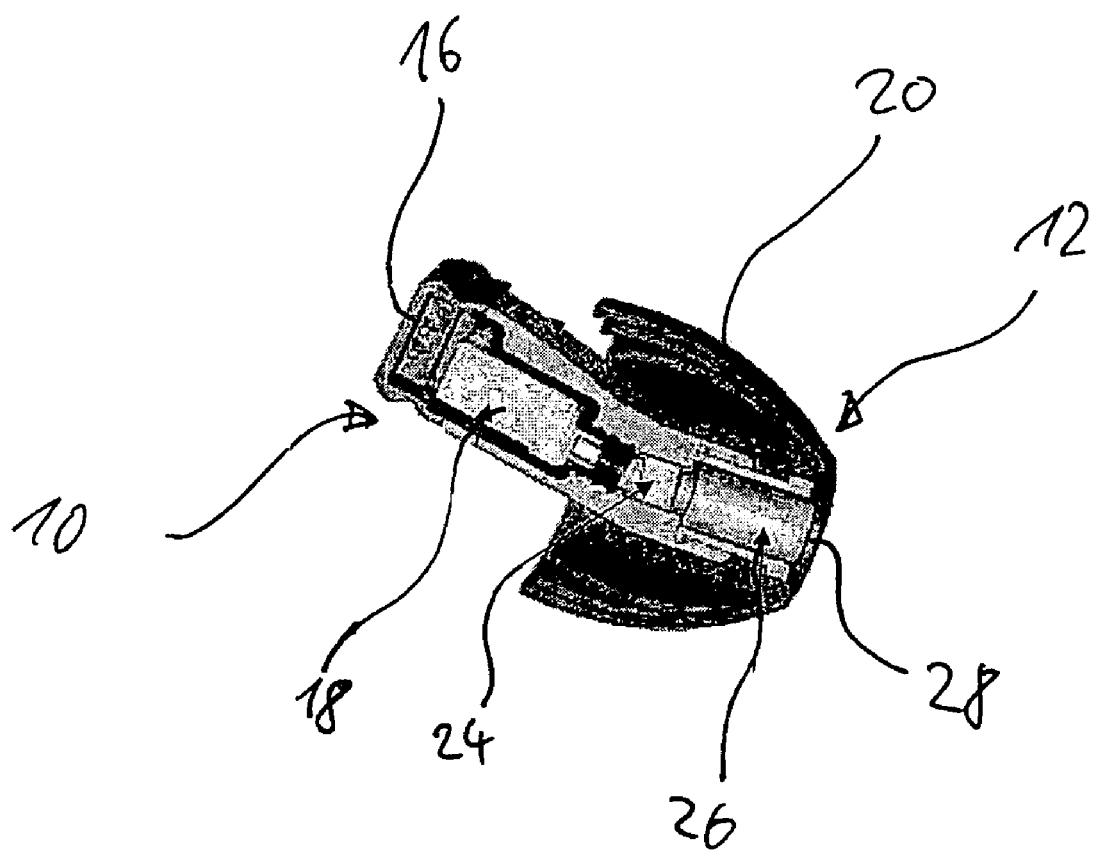
FIG. 1B is a longitudinal sectional view of the earphone of FIG. 1A when having been assembled.

FIGS. 1A and 1B show an example of an earphone according to the invention, comprising a speaker unit 10 and an earpiece 12. The speaker unit 10 comprises a wiring connector 14 for supplying audio signals from an audio signal source (not shown) which may be, for example, a portable audio player, a home hi-fi device, a professional sound device, a wireless high frequency receiver for audio monitoring, etc., and a rigid case 16 housing a sound driver 18. The earpiece 12 comprises a shell or ear tip 20, a generic case 22 and an exchangeable acoustic damper 24. The generic case 22 of the earpiece 12 comprises a resonator 26 is located between the acoustic damper 24 and a sound outlet opening 28 at the inner end of the earpiece 12. The resonator 26 may be designed as a quarter-wave resonator or as an expansion horn.

Figure 10A:
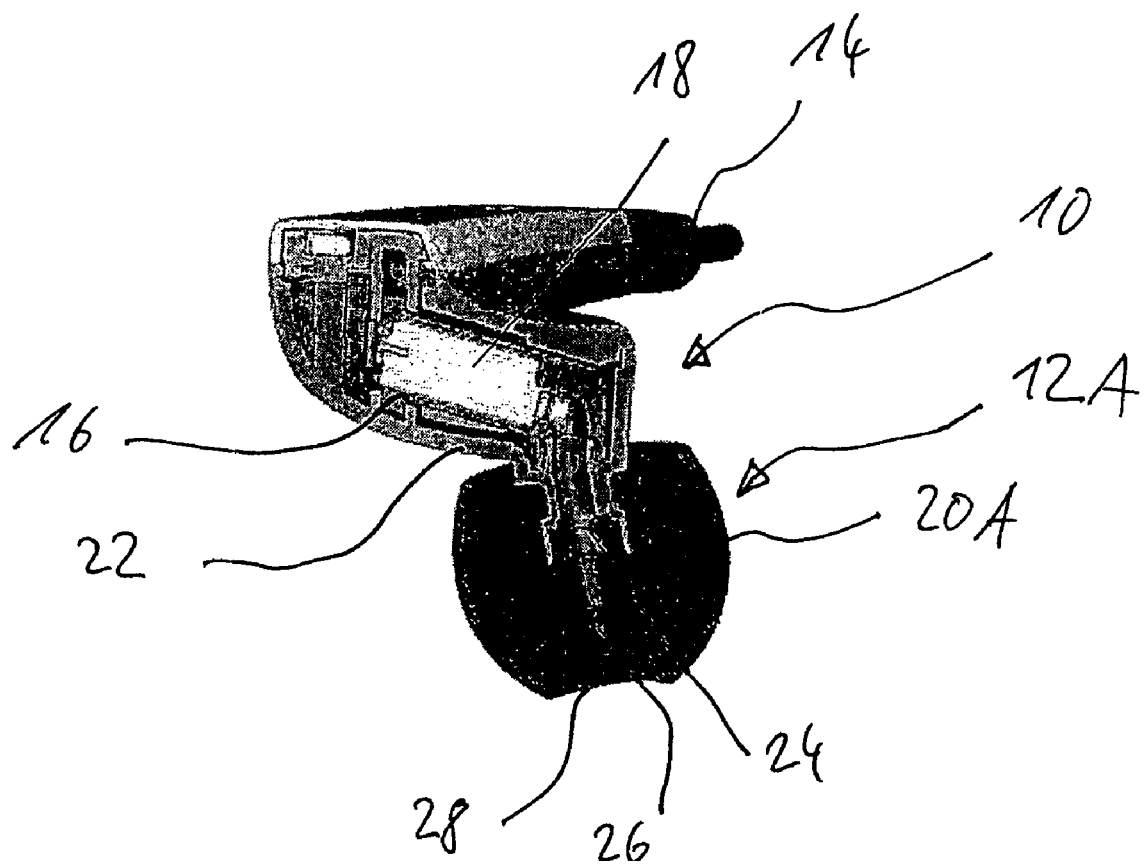
FIGS. 10A and 10B are schematic longitudinal sectional views of alternative embodiments of an earphone according to the invention.
Figure 10B:
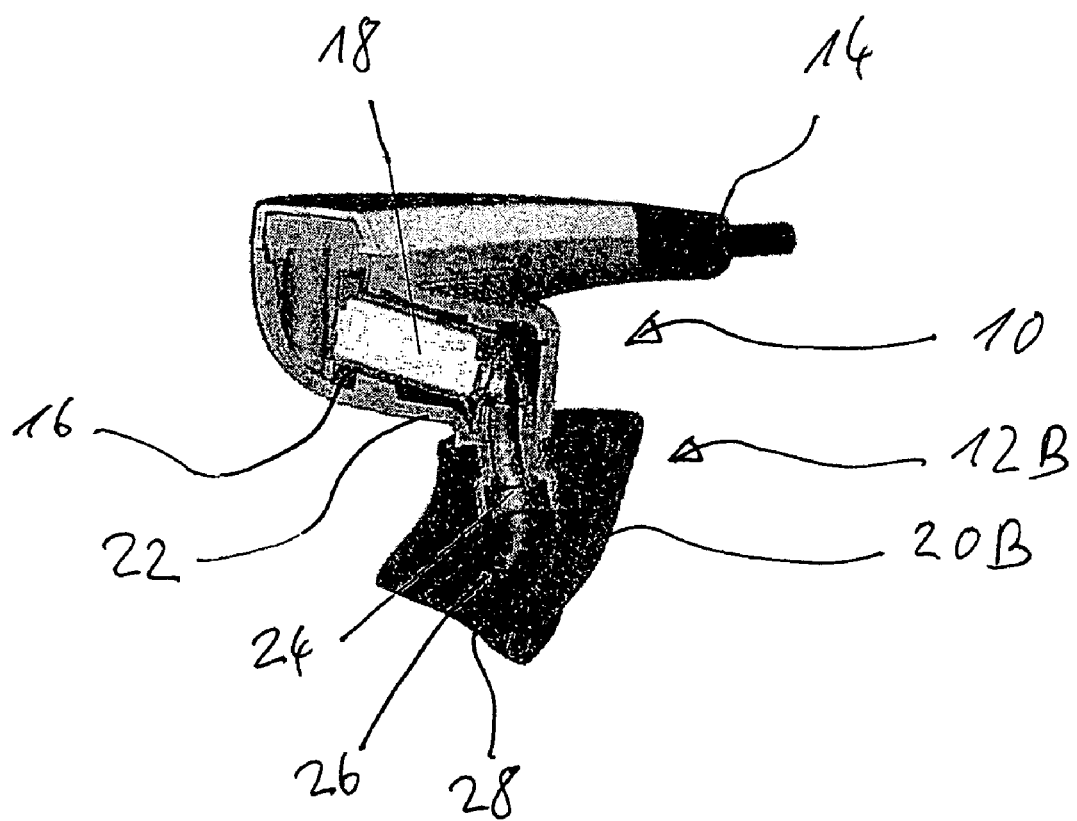

The wiring connector 14 may be detachable plug/socket connection, as shown in FIGS. 1A and 1B, or it may be a wiring element fixedly connected to the speaker unit 10, as shown in FIGS. 10A and 10B.

In the embodiment of FIGS. 1A, 1B the earpiece 12 is a generic earpiece, i.e. the shell 20 is made of a relatively soft material, for example, silicon, and it has an outer surface of standard shape. For fitting the earpiece 12 to different ear sizes the shell 20 may be provided in different sizes. The shell 20 may be connected to the generic case 22 in a detachable manner in order to exchange the shell 20, for example, if deteriorated during use.

The speaker unit 10 is connected to the earpiece 12 in a detachable manner by inserting the front end of the rigid case 16 into the generic case 22 of the earpiece 12.

Figure 7A:
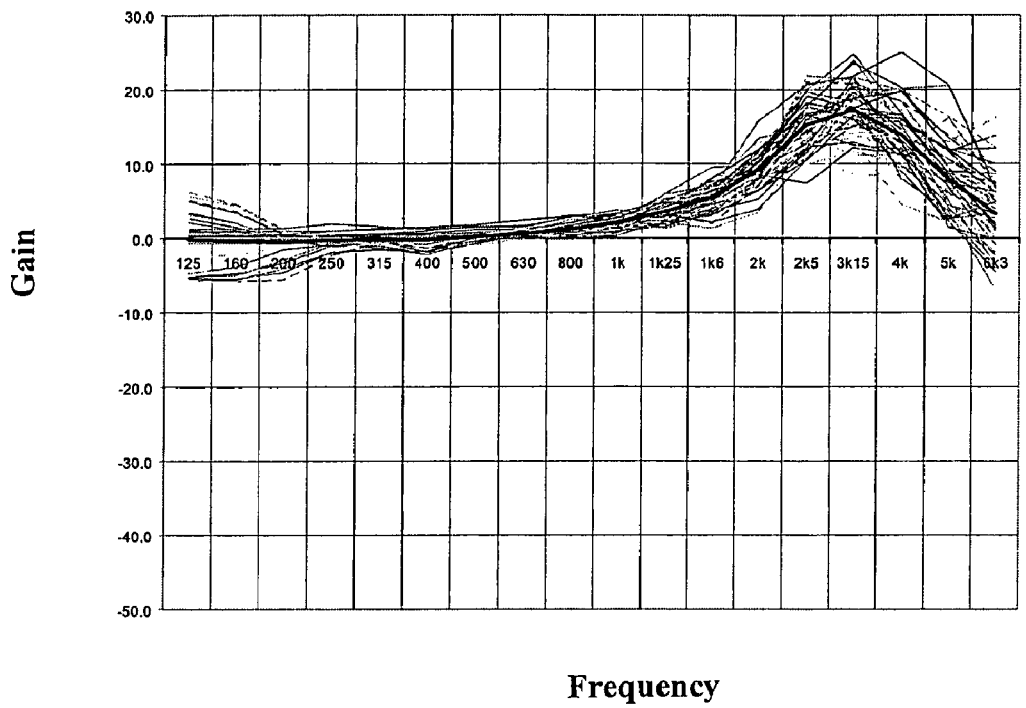
FIG. 7A shows examples of measurements of the real open ear gain of different persons.
Figure 7B:
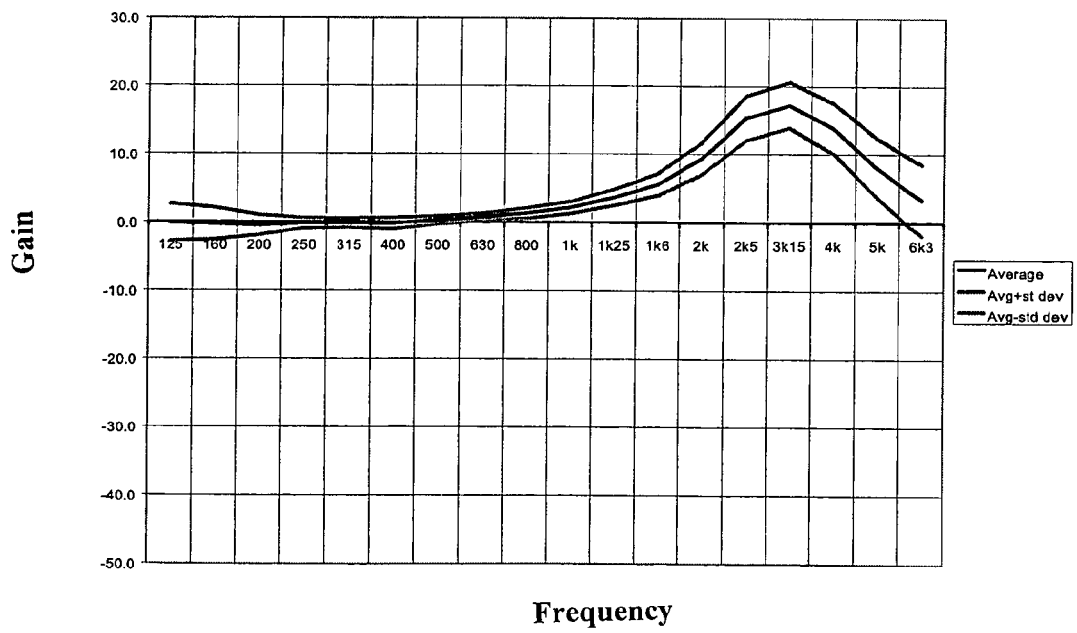
FIG. 7B shows the average, the average plus standard deviation and the average minus standard deviation of the measurements of FIG. 7A.

The sound driver 18 usually has a frequency response having a maximum within the range of 2000 Hz to 4000 Hz, preferably 2700 Hz, in order to enable restoring the user's natural ear resonance which is otherwise destroyed by the missing open ear gain when wearing an earphone. The output port of the sound driver 18 is acoustically connected with the exchangeable acoustic damper 24 which reduces the level of the sound driver peak according to its specific acoustic resistance value but which has relatively little influence on the frequency response of the system at other frequencies, i.e. the acoustic damper 24 is designed for affecting the frequency response of the earphone primarily in the frequency range of the maximum of the sound driver 18. If an acoustic damper 24 having a relatively low acoustic resistance is selected, the level of the maximum of the sound driver 18 is high, so that the open ear gain of the user is essentially fully compensated; if an acoustic damper 24 having a relatively high acoustic resistance is selected, the level of the sound driver maximum is low and the open ear gain is less compensated. By selecting the type of acoustic damper 24 the frequency response of the earphone can be tuned to the individual preference and individual natural open ear gain of the user. The option for such individual adjustment is important, because the natural open ear gain, and in particular the level of the natural open ear resonance, is quite different for different persons, as shown in FIGS. 7A and 7B, where the variation of the natural open ear gain vs. frequency for different persons is shown.

Figure 8:
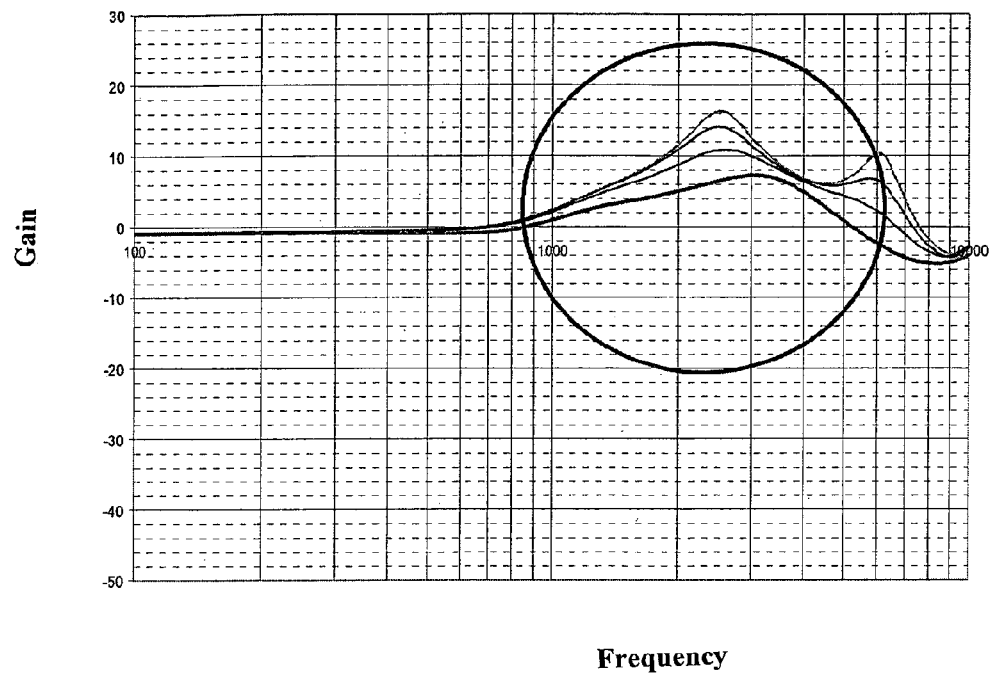
FIG. 8 shows examples of the frequency response of an earphone when used with different acoustic dampers.

The acoustic damper 24 is also acoustically coupled with the resonator 26 which is designed for increasing the high frequencies above 10 kHz for enabling high fidelity applications of the earphone. In FIG. 8 examples of the frequency response of the earphone are shown for four different types of acoustic dampers 24. It can be seen in FIG. 8 how the amplitude and to some extent also the position of the peak of the frequency response in the region of the natural open ear gain can be adjusted by selecting the appropriate acoustic damper 24.

Figure 9:
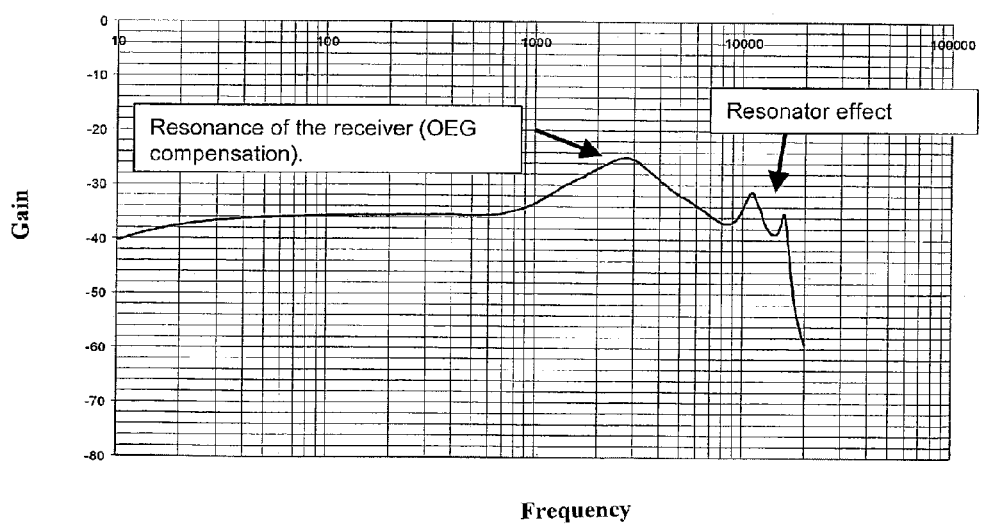
FIG. 9 shows another example of a typical frequency response of an earphone according to the invention.

FIG. 9 shows another example of the frequency response of an earphone according to the invention, wherein the resonance of the sound driver 18 provides for a global maximum in the region around 2700 Hz and wherein the effect of the resonator 26 enhances the high-frequency response due to resonances above 10 kHz.

In order to optimize the frequency response of the earphone, first a test acoustic damper 24 may be inserted into the earpiece case 22, thereby forming a test earphone having a test frequency response, which test earphone then is inserted into the user's ear for testing the acoustic performance of the test earphone. Thereafter, the earphone is removed from the user's ear and the test acoustic damper 24 is replaced by an acoustic damper 24 of a different type, i.e. having a different acoustic resistance, with the earphone obtained thereby being inserted again into the user's ear, in order to test the acoustic performance of the earphone using this different acoustic damper. This procedure of testing an acoustic damper of a different type may be repeated, until a desired final frequency response is obtained by a final earphone using a final acoustic damper 24, which approaches the user's natural open ear gain or listening preferences more closely than the test dampers tested before. The final earphone is selected for long-term use. Testing of the frequency response may be effect by simply using the user's judgement. Optionally, the user's natural open ear gain may be measured for selecting the final acoustic damper 24. Conveniently a tool may be provided for exchanging the acoustic dampers 24.

Figure 2A:
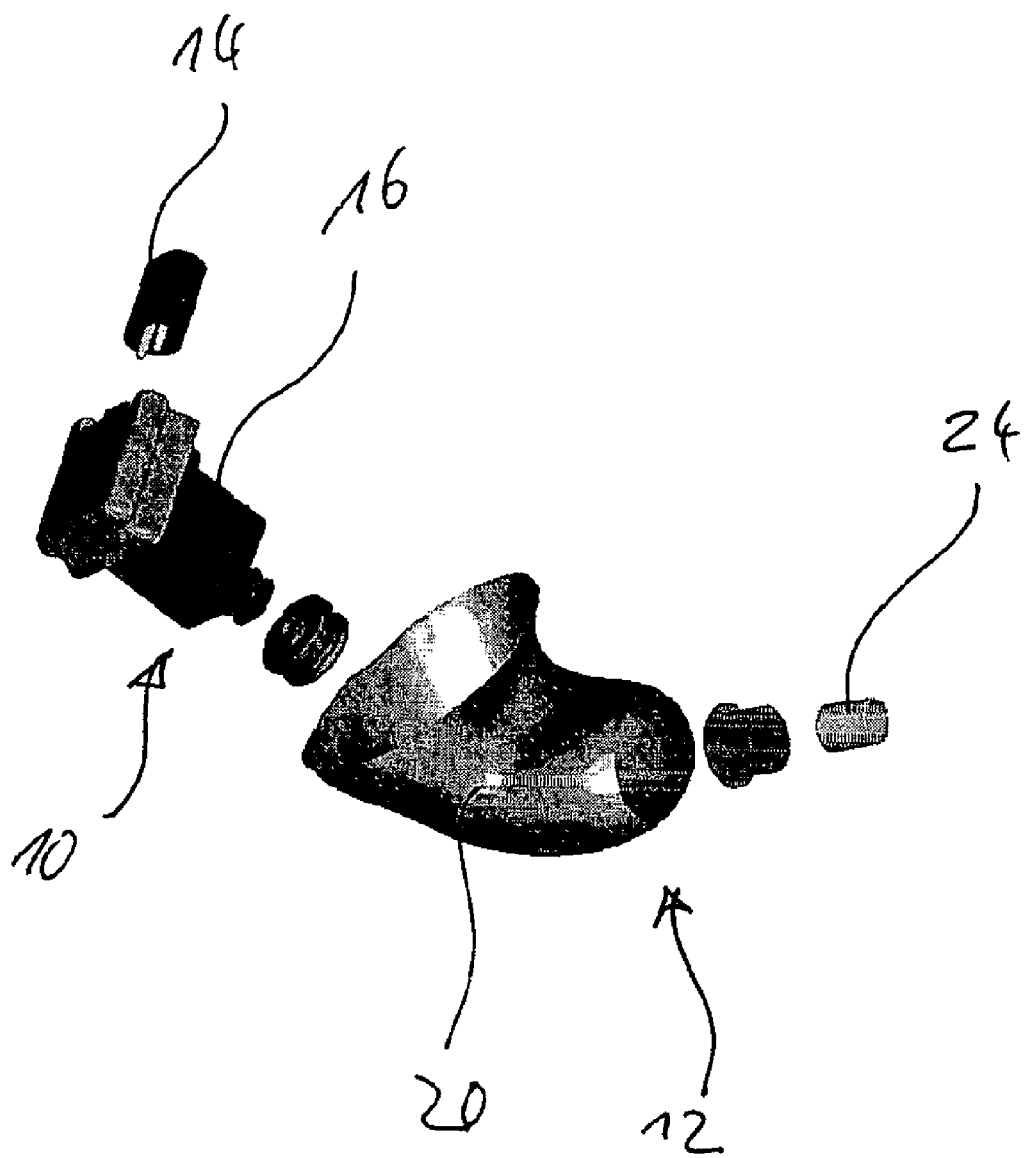
FIGS. 2A and 2B are views like FIGS. 1A and 1B, respectively, wherein a second embodiment of the invention is shown.
Figure 2B:
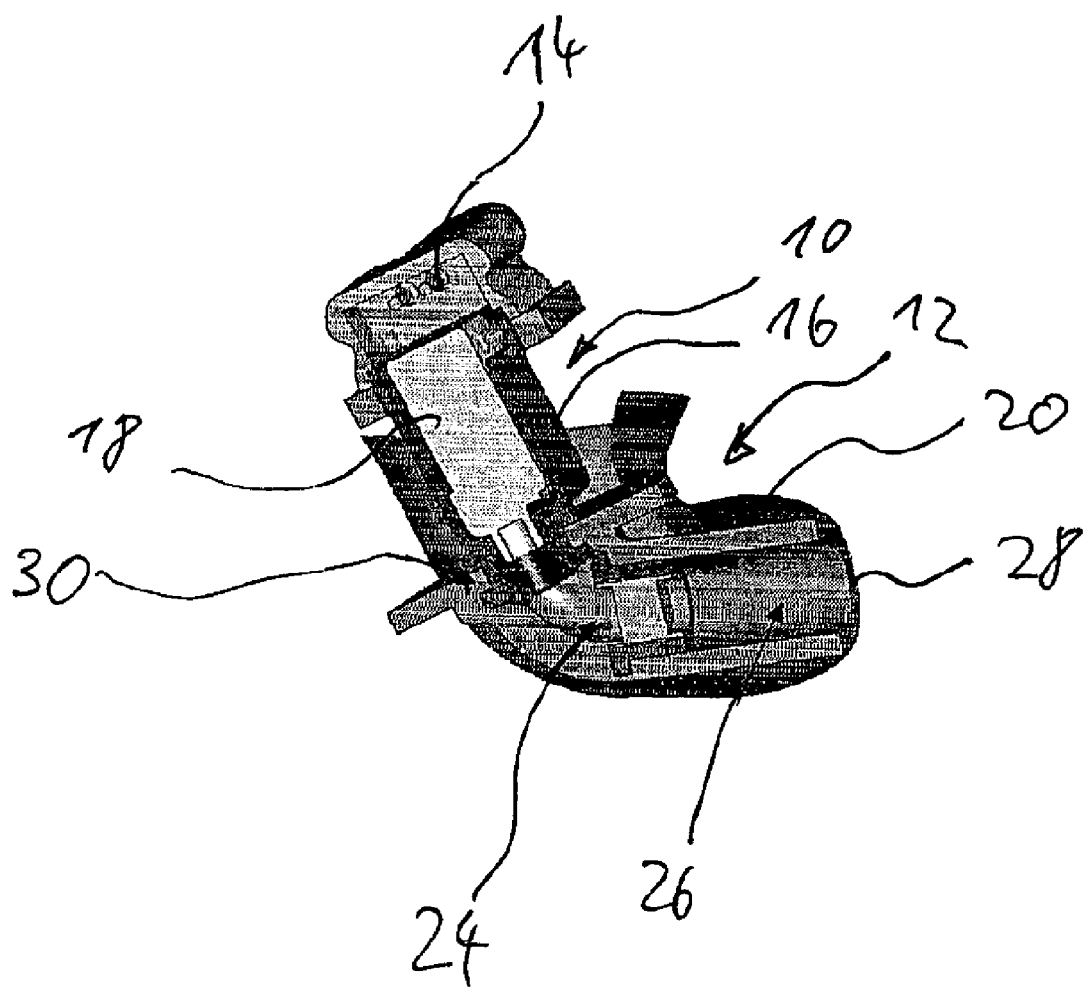

In FIGS. 2A and 2B an embodiment is shown wherein the generic earpiece 12 is replaced by a customized earpiece 12 having a hard shell 20 having an outer surface individually shaped according to the measured inner shape of the user's ear canal and outer ear in order to achieve optimized fit of the earpiece 12. The hard shell 20 may be produced, for example, by a three-dimensional printing process, with the shape of the user's ear canal and outer ear being measured, for example, by taking a silicon ear impression which is then scanned or by direct ear scanning, with the data obtained by the scanning process being imported to a modelling software which controls a 3D-printer in order to assemble the shell 20.

In the example shown in FIG. 2B the rigid case 16 of the speaker unit 12 is inserted in a detachable manner into a fixation system 30 provided in the interior of the shell 20.

Figure 3:
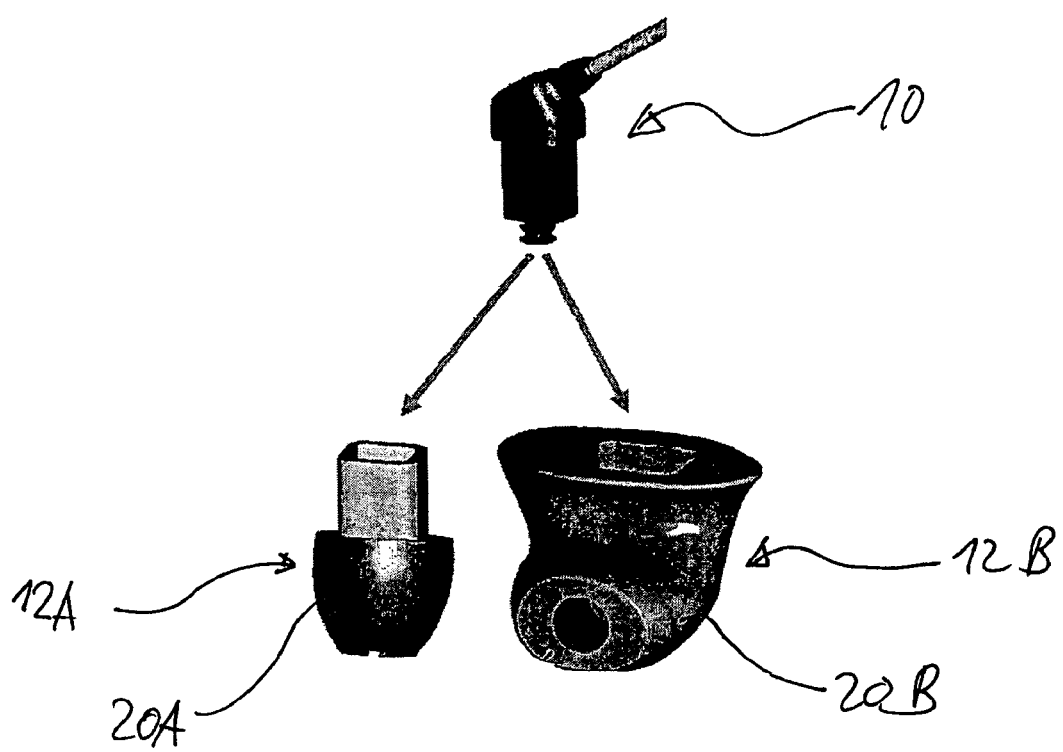
FIG. 3 is a perspective view of an earphone system according to a further embodiment of the invention comprising a generic earpiece and a customized earpiece.

Preferably, the speaker unit 10 and all kind of earpieces 12 are designed in such a manner that the speaker unit 10 can be used with any type of the earpieces 12. This is illustrated in the example shown in FIG. 3, according to which a speaker unit 10 may be used alternatingly with an earpiece 12A comprising a soft generic shell 20A and a customized earpiece 12B comprising a customized hard shell 20B.

By using this principle, the user of the earphone may test the acoustic performance of the earphone by connecting the speaker portion 10 to the generic earpiece 12A in order to judge whether he actually wants to purchase an earphone comprising the speaker unit 10, i.e. a test earphone is created by connecting the speaker unit 10 to the generic earpiece 12A. Once the user has decided to purchase the earphone, a customized earpiece 12B comprising a customized shell 20B will be manufactured based on a measurement/impression of the user's ear canal and outer ear.

The earpieces 12 are designed in such a manner that they are of the intra-auricular type, i.e. they are worn in the user's ear canal and/or the user's concha. FIG. 6A shows an example of a customized earpiece 12 which is designed for being worn only in the ear canal (intra-canal), and FIG. 6B shows an example of a customized earpiece 12 of the full concha type.

Figure 4:
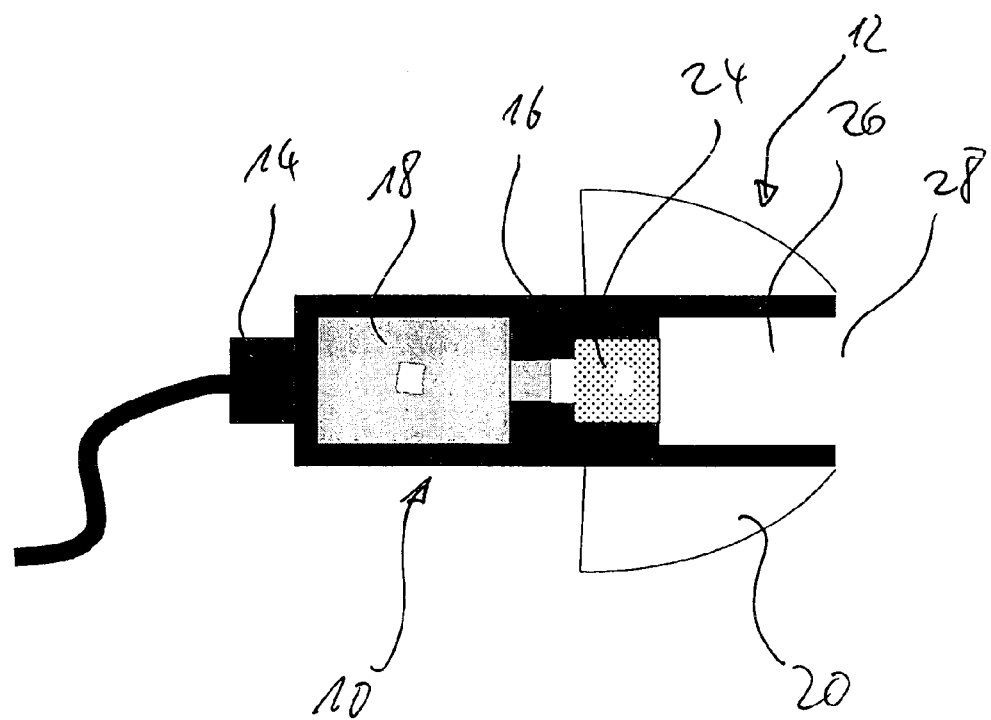
FIG. 4 is a schematic longitudinal sectional view of an alternative embodiment of an earphone according to the invention.

In the embodiments shown in FIGS. 1 and 2 the resonator 26 and the acoustic damper 24 are part of the earpiece 12. Since elements these are the most sensible acoustic elements for the coupling with the ear, this arrangement allows for excellent acoustic optimization, in particular, if the earpiece is of the customized type. An alternative embodiment is shown in FIG. 4, wherein the rigid case 16 of the earpiece speaker unit 10 is designed in such a manner that it includes the resonator 26, the sound opening 28 and the acoustic damper 24. In this case, the earpiece 12 essentially consists of the shell 20, into which the front end of the case 16 is inserted. In the embodiment shown in FIG. 4 the shell 20 is of the generic soft type.

FIG. 5 shows an example of the sound driver 18, comprising electrical wirings 32, a passive electrical filter 34, a high frequency sound transducer 36, a low-frequency sound transducer 38, non-exchangeable internal acoustic dampers 40 for the sound transducers 36 and 38 and an output port 42 to the exchangeable acoustic damper 24. The dampers 40 also could be included in the output port 42. The sound transducers 38, 40 may be armature transducer or dynamic diaphragm transducers. The sound driver 18 also may include a back vent (not shown in FIG. 5).

In all embodiments the exchangeable acoustic damper 24 also may serve as an ear wax protector.

FIGS. 10A and 10B show embodiments, wherein the rigid case 16 of the earpiece speaker unit 10 is designed in such a manner that it includes the acoustic damper 24, whereas the resonator 26 and the sound opening 28 are part of the earpiece 12A, 12B into which the front end of the case 16 is inserted. In the embodiment shown in FIG. 10A the shell 20A is of the generic soft type; In the embodiment shown in FIG. 10A the shell 20B is of the customized type. The case 16 of the speaker unit 10 is designed such that the speaker unit 10 may be used either the generic earpiece 10A or the customized earpiece 10B.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. An earphone system comprising an earphone and at least two acoustic dampers, the earphone comprising a speaker unit and an earpiece the speaker unit comprising a sound driver, a wiring connector for providing audio signals to the sound driver and a case housing the sound driver, the earpiece comprising a sound outlet opening and being designed for being worn in at least one of a user's ear canal and a user's concha, the sound driver having a frequency response having a maximum within the range of 2000 Hz to 4000 Hz, wherein the speaker unit is for being inserted into the earpiece, wherein each of the acoustic dampers is for being inserted into the earpiece or the speaker unit in an exchangeable manner and wherein each of the acoustic dampers, when used with the earphone, has a frequency response different from that of each of the other acoustic dampers.

2. The system of claim 1, wherein the earpiece comprises a hard shell having an outer surface individually shaped according to the measured inner shape of the user's ear canal and outer ear.

3. The system of claim 1, wherein the earpiece comprises a resonator upstream of the sound outlet opening.

4. The system of claim 1, wherein the sound driver, the resonator and the damper are designed for imparting a frequency response to the earphone which restores a user's natural ear resonance when the earphone is worn by the user.

5. The system of claim 4, wherein the sound driver has a frequency response having a global maximum within a range of 2000 Hz to 4000 Hz.

6. The system of claim 4, wherein the resonator is designed for increasing a gain at frequencies above 10 kHz.

7. The system of claim 1, wherein the resonator is a quarter-wave resonator or an expansion horn.

8. The system of claim 1, wherein the acoustic damper is located upstream of the resonator.

9. The system of claim 1, wherein the sound driver includes an armature transducer or a dynamic diaphragm transducer.

10. The system of claim 1, wherein the sound driver includes a plurality of loudspeakers.

11. The system of claim 1, wherein the acoustic damper is part of the speaker unit.

12. The system of claim 1, wherein the sound driver includes at least one non-exchangeable acoustic damper.

13. The system of claim 1, wherein the earpiece comprises a soft shell having an outer surface of standard shape.

\* \* \* \* \*